United States Patent [19]
Amano et al.

[11] Patent Number: 6,003,033
[45] Date of Patent: Dec. 14, 1999

[54] SYSTEM AND METHOD FOR DESCRIBING AND CREATING A USER DEFINED ARBITRARY DATA STRUCTURE CORRESPONDING TO A TREE IN A COMPUTER MEMORY

[75] Inventors: Tomio Amano, Tokyo-to; Akio Yamashita, Urawa; Hiroyasu Takahashi, Yokohama, all of Japan

[73] Assignee: International Business Machines Corporation, Armonk, N.Y.

[21] Appl. No.: 07/843,704

[22] Filed: Feb. 28, 1992

[51] Int. Cl.$^6$ ...................................................... G06F 17/30
[52] U.S. Cl. .................................. 707/100; 707/2; 707/3; 707/101; 707/102
[58] Field of Search .................................... 395/600, 650, 395/800, 160; 707/100, 101, 102, 2, 3

[56] References Cited

U.S. PATENT DOCUMENTS

| | | | |
|---|---|---|---|
| 5,121,477 | 6/1992 | Koopmans et al. | 395/333 |
| 5,257,185 | 10/1993 | Farley et al. | 707/100 |
| 5,257,365 | 10/1993 | Powers | 395/600 |
| 5,287,488 | 2/1994 | Sakata et al. | 395/500 |
| 5,289,567 | 2/1994 | Roth | 395/600 |
| 5,295,261 | 3/1994 | Simonetti | 395/600 |
| 5,317,733 | 5/1994 | Murdock | 704/203 |
| 5,365,433 | 11/1994 | Steinberg et al. | 704/9 |
| 5,485,610 | 1/1996 | Gioielli et al. | 707/102 |
| 5,581,756 | 12/1996 | Nakabayashi | 707/2 |
| 5,873,087 | 2/1999 | Brosda et al. | 707/100 |

*Primary Examiner*—Jean R. Homere
*Attorney, Agent, or Firm*—Thomas P. Dowd; Ronald L. Drumheller

[57] ABSTRACT

A system that allows a user to describe a tree or a set of trees in a table, and the system automatically generates a data structure corresponding to the tree or the set of trees in memory in accordance with the description. The system interprets a table with one or more columns wherein each of the node attributes given to a node are entered, allocates a memory area to each of the nodes, sets data on the attributes given to the node, and generates pointer data indicating the connections of the memory areas. The hierarchy of the nodes and the sequence of nodes linked immediately below the same node are determined on the basis of the sequence of rows corresponding to the nodes and levels assigned to the nodes in the table.

19 Claims, 8 Drawing Sheets

| NEST | OBJECT NAME | MANDATORY | CONSTRUCTION | | | | F. S. |
|---|---|---|---|---|---|---|---|
| | | | ARRANGE-MENT | MINIMUM | MAXIMUM | SUCCESSOR'S NAME | |
| 0 | PAPER | | V | 1 | 1 | | |
| 1 | TITLE | Y | V | 1 | 3 | Ch_String | |
| 1 | AUTHOR | Y | V | 1 | 2 | Ch_String | BB |
| 1 | BODY | Y | | | | | AB |

| NEST | OBJECT NAME | MANDATORY | CONSTRUCTION | | | | F. S. |
|---|---|---|---|---|---|---|---|
| | | | ARRANGE-MENT | MINIMUM | MAXIMUM | SUCCESSOR'S NAME | |
| 0 | BODY | Y | H | 2 | 2 | | |
| 1 | | | V | 1 | 50 | Ch_String | |

| LEVEL | NAME | ATTRIBUTE | | ... |
| --- | --- | --- | --- | --- |
| | | MINIMUM | MAXIMUM | |
| 0 | A | 1 | 1 | ... |
| 1 | B | 1 | 1 | ... |
| 1 | C | 1 | 1 | ... |
| 1 | D | 1 | 1 | ... |
| 2 | F | 1 | 1 | ... |
| 2 | G | 1 | 1 | ... |
| 3 | J | 1 | 1 | ... |
| 1 | E | 1 | 1 | ... |
| 2 | H | 1 | 1 | ... |
| 2 | I | 1 | 1 | ... |

| LEVEL | NAME | ATTRIBUTE | | ... |
|---|---|---|---|---|
| | | MINIMUM | MAXIMUM | |
| 0 | D | 1 | 1 | ... |
| 1 | F | 1 | 1 | ... |
| 1 | G | 1 | 1 | ... |
| 2 | J | 1 | 1 | ... |

FIG. 7

| LEVEL | NAME | ATTRIBUTE | | ... |
|---|---|---|---|---|
| | | MINIMUM | MAXIMUM | |
| 0 | A | 1 | 1 | ... |
| 1 | B | 1 | 1 | ... |
| 1 | C | 1 | 1 | ... |
| 1 | D | | | ... |
| 1 | E | 1 | 1 | ... |
| 2 | H | 1 | 1 | ... |
| 2 | I | 1 | 1 | ... |

FIG. 8

| NEST | OBJECT NAME | MANDATORY | CONSTRUCTION | | | | F. S. |
|---|---|---|---|---|---|---|---|
| | | | ARRANGE-MENT | MINIMUM | MAXIMUM | SUCCESSOR'S NAME | |
| 0 | PAPER | | | | | | |
| 1 | TITLE | Y | | | | | |

| NEST | OBJECT NAME | MANDATORY | CONSTRUCTION | | | | F. S. |
|---|---|---|---|---|---|---|---|
| | | | ARRANGE-MENT | MINIMUM | MAXIMUM | SUCCESSOR'S NAME | |
| 0 | PAPER | | V | 1 | 1 | | |
| 1 | TITLE | Y | V | 1 | 3 | Ch_String | |
| 1 | AUTHOR | Y | V | 1 | 2 | Ch_String | BB |
| 1 | BODY | Y | H | 2 | 2 | | AB |
| 2 | | Y | V | 1 | 50 | Ch_String | |

FIG. 11

| NEST | OBJECT NAME | MANDATORY | CONSTRUCTION | | | | F. S. |
|---|---|---|---|---|---|---|---|
| | | | ARRANGE-MENT | MINIMUM | MAXIMUM | SUCCESSOR'S NAME | |
| 0 | PAPER | | V | 1 | 1 | | |
| 1 | TITLE | Y | V | 1 | 3 | Ch_String | |
| 1 | AUTHOR | Y | V | 1 | 2 | Ch_String | BB |
| 1 | BODY | Y | | | | | AB |

| 0 | BODY | Y | H | 2 | 2 | | |
|---|---|---|---|---|---|---|---|
| 1 | | | V | 1 | 50 | Ch_String | |

FIG. 12

FIRST GenTree CALL
○ Paper
FIG. 13
SECOND GenTree CALL
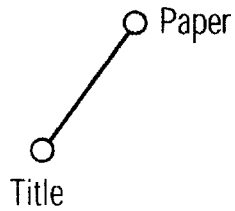
FIG. 14
THIRD GenTree CALL
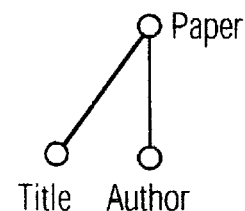
FIG. 15
FOURTH GenTree CALL
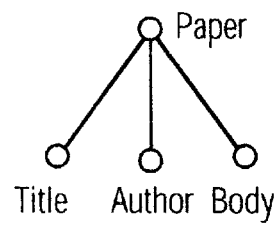
FIG. 16
FIFTH GenTree CALL
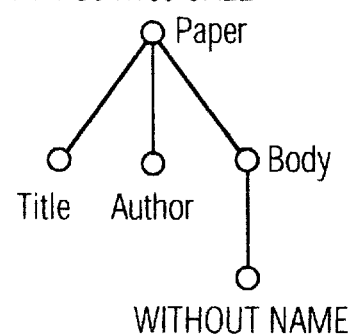
FIG. 17

SYSTEM AND METHOD FOR DESCRIBING AND CREATING A USER DEFINED ARBITRARY DATA STRUCTURE CORRESPONDING TO A TREE IN A COMPUTER MEMORY

BACKGROUND OF THIS INVENTION

1. Field of Utilization

This invention relates to electronic filing systems for computer-aided management and retrieval of documents and more particularly to a system and a method for generating an electronic data structure corresponding to a tree or a set of trees representing a model that can be used for understanding the layout of a document or the like.

2. Prior Art

Electronic filing systems for computer-aided management and retrieval of documents have recently become available for use in offices. Current systems, however, essentially store documents just in the form of a picture or image of the document. As a scheme for storing information, therefore, there is no substantial difference between these systems and the conventional paper-based filing. In order to establish an advanced filing system, it is essential to be able to extract specific information on the contents of a document from a document image.

If a system is intended to function as a database storing the entire contents of documents, coding of the whole content of each document is necessary. Even, if the entire contents are not to be stored, entry of coded information for searching titles, publication names, key words, and so on is indispensable. OCR techniques for printed characters are expected to be a tool to support such coding operations. However, in order to extract information for retrieval from a document image by OCR, it is essential to know the position in the document where the necessary information is printed. Additionally, the usage of an electronic filing system varies with application. In some cases, coding is required for a portion of a document, for example, an abstract of a paper. If each time an operator enters a document in a database, he has to specify each of the portions to be recognized, high efficiency in document entry is not to be expected. Therefore, there is a need for a technology to provide efficient computer-aided analysis of a document image and automatic understanding of its layout, i.e., the arrangement of the information therein. Layout understanding includes segmenting a document image into regions of characters, illustrations, photographs, tables, graphs and other image objects, and analyzing the structures of the respective regions. In electronic filing, it is important to interpret character strings as titles, authors, bodies and so on after they are roughly segregated from other regions such as row segments.

The objects of a document image, in general, have a hierarchical structure based On their IS-PART-OF relationships. For example, a document may consist of pages, with each page consisting of a title, author's name, and body, and the body consisting of some columns. The hierarchical structure may be represented by a tree wherein an intermediate node corresponds to one of the objects of a document image, such as the title and so on, and a terminal node (leaf) corresponds to a character string.

A method has been proposed whereby a user specifies a tree-structured model to provide knowledge on the layout, and the system performs analysis in accordance with the model, as disclosed by A. Dengel and G. Barth, "High Level Document Analysis Guided by Geometric Aspects," Int. Journal of Pattern Recognition and Artificial Intelligence 2, 4, pp. 641–655, 1988. As a method for generating a data structure corresponding to a tree in memory, this is an advantageous and feasible method, from the viewpoint of the burden on users, since a user merely describes a tree in a readable form and the system interprets the resultant description so as to generate the data structure in memory. One such example is found in, G. Nagy, S. Seth, "Hierarchical Representation of Optically Scanned Documents," Proc. 7th ICPR [Montreal], 347–349, which proposes an attribute grammar for a user to describe the skeleton of a tree and attributes to be given to each node in the tree. However, this forces users into doing a kind of programming and is not appropriate for end users to describe a model.

Since there are various types of layouts corresponding to various kinds of documents, it is impossible to prepare models for all types of layouts beforehand, and end users are therefore required to describe and modify models. Consequently, easy description and modification of models is an important feature in a system for document image analysis for layout understanding. This requirement of easy description must be attained while maintaining sufficient representation capability to permit a user to cope with various types of layouts. The foregoing method of describing a tree according to an attribute grammar does not satisfy the requirement.

In order for a user to describe a tree, not limited to a layout model, in an understandable form, a graphics editor is generally used for editing a flowchart representing a tree on a display. However, computers available for graphics editors are limited. In addition, although graphics editors are suitable for use in describing the skeleton of a tree, that is, the hierarchy of nodes and the sequence of child nodes linked to a particular node, they are not suitable for use in describing attributes given to respective nodes.

A system for drawing a tree-structure chart is disclosed in JA PUPA 2-589818. This system is directed to charts representing tree structures of program modules. It permits entry of information for drawing a tree-structure chart through a terminal which does not support graphics functions. Since call relationships among modules constitute a tree structure with a main program as its root, the drawing system is a kind of tree gene rating system. With this system, a user describes information on call relationships among modules by using a text editor. FIG. 1 shows an example of how the information on a tree-structure chart is described. Branching of the tree is indicated by key words such as IF, THEN, ELSE and so on in the text. The system interprets the text including these key words, and generates a tree-structure chart as shown in FIG. 2. FIGS. 1 and 2 are drawings shown in the Japanese publication referred to above.

However, since a special key word is assigned for each branching of a tree, end users are require d to understand the meaning of the key words and get skilled in their usage.

Such a method of description is familiar to programmers, but it is not appropriate for end users. It would take much time for end users new to a key board to enter key words, and they would possibly make spelling and grammatical errors. In addition, if a complicated tree consisting of a number of hierarchy levels is expressed with this description method, then the resultant description will be complicated, and the entire hierarchical structure of the tree will be difficult to understand from the resultant description.

Problem to be Solved

The problem shared by the foregoing description methods, in addition to the stated difficulties, is that they can express only one specific tree, that is, they cannot express a set of trees. However, the expression of a set of trees is desirable for some applications. As to the first page of a paper, for example, the existence of objects such as titles and authors is mandatory, but that of footnotes is not. A paper, generally containing two columns on each page, may contain only one column on the last page. To cope with such variations, the conventional methods require that the description be made to include descriptions separately for a tree with a footnote and a tree without it, and for a tree containing one column node and a tree containing two column nodes. Accordingly, the burden is heavy for users attempting to describe a tree-structure for a document conventionally.

It is therefore an object of the present invention to provide a system and a method making it possible for a user to easily describe a tree to be input to memory and capable of generating a data structure representing the tree in memory in accordance with the resultant description.

Another object of the invention is to provide a system and a method making it possible for a user to easily understand a tree to be generated in memory and the resultant description of the tree and capable of generating a data structure representing the tree in memory in accordance with the resultant description.

A further object of the invention is to provide a system and a method making it possible for a user to describe a tree to be input to memory by using a text editor and capable of generating a data structure representing the tree in memory in accordance with the resultant description.

Another object of the invention is to provide a system and a method making it possible for a user to describe a set of trees to be input to memory and capable of generating a data structure representing the set of trees in memory in accordance with the resultant description.

SUMMARY OF THE INVENTION

In order to solve the prior problems and attain the foregoing objects, a system according to the present invention, for generating a data structure representing a tree or a set of trees in memory, is provided in the form of a table with one or more columns, where for each of the node kinds contained in the tree or set of trees attributes given thereto are entered, and means for interpreting the table to achieve allocating a memory area to each of the node kinds, setting data in the area on the attributes given thereto, and generating pointer data indicating the connections of such memory areas.

When the system is used to describe a tree or a set of trees, it is sufficient for a user to enter attributes for each of the node kinds in the table by using an editor. A text editor may be used for this purpose. The table includes, for example, a column for entering the level of each of the node kinds in the tree or set of trees. Using this column the table interpreter means can determine the hierarchy of node kinds and the sequence of node kinds linked immediately below the same node kind, on the basis of the sequence of rows describing the attributes given to the node kinds and the levels assigned to them. This determination is used to generate pointer data in memory in accordance therewith.

The table may also include a column for entering names of the node kinds, and a column for entering the number of nodes belonging to the respective node kinds. In the latter case, the table interpreter means treats the data on the number of nodes as attribute data, and sets them in a memory area allocated to the node kind.

It is also possible to store a prepared table as a module in a storage unit external to the memory, transfer it to memory for editing, and return the edited table to the storage unit. Further, to facilitate the creation of a large table, a main table and sub-tables may be prepared, and means are provided for determining the presence or absence of an insufficient entry in a main table and combining a sub-table with the main table to create a single complete table if such an insufficient entry is found.

Using the invention it is possible to provide efficient computer-aided analysis of a document image and automatic understanding of its layout, i.e., the arrangement of the information therein.

BRIEF DESCRIPTION OF THE DRAWINGS

FIG. 7 is a diagram showing a table for describing a sub-tree of the tree shown in FIG. 4.

FIG. 8 is a diagram showing a table for describing a main tree with which the table of FIG. 7 may be combined for describing the tree of FIG. 4.

FIG. 11 is a diagram showing a table for describing a layout model of the front page of the paper shown in FIG. 10.

FIG. 12 is a diagram showing two tables for describing a layout model of the front page of the paper shown in FIG. 10.

FIG. 13 is an explanatory diagram of a first step in a process for generating a data structure in accordance with the table of FIG. 11.

FIG. 14 is an explanatory diagram of a second step in a process for generating the data structure in accordance with the table of FIG. 11.

FIG. 15 is an explanatory diagram of a third step in a process for generating the data structure in accordance with the table of FIG. 11.

FIG. 16 is an explanatory diagram of a fourth step in a process for generating the data structure in accordance with the table of FIG. 11.

FIG. 17 is an explanatory diagram of a fifth step in a process for generating the data structure in accordance with the table of FIG. 11.

DETAILED DESCRIPTION OF THE PREFERRED EMBODIMENTS

Figures 1, 2:
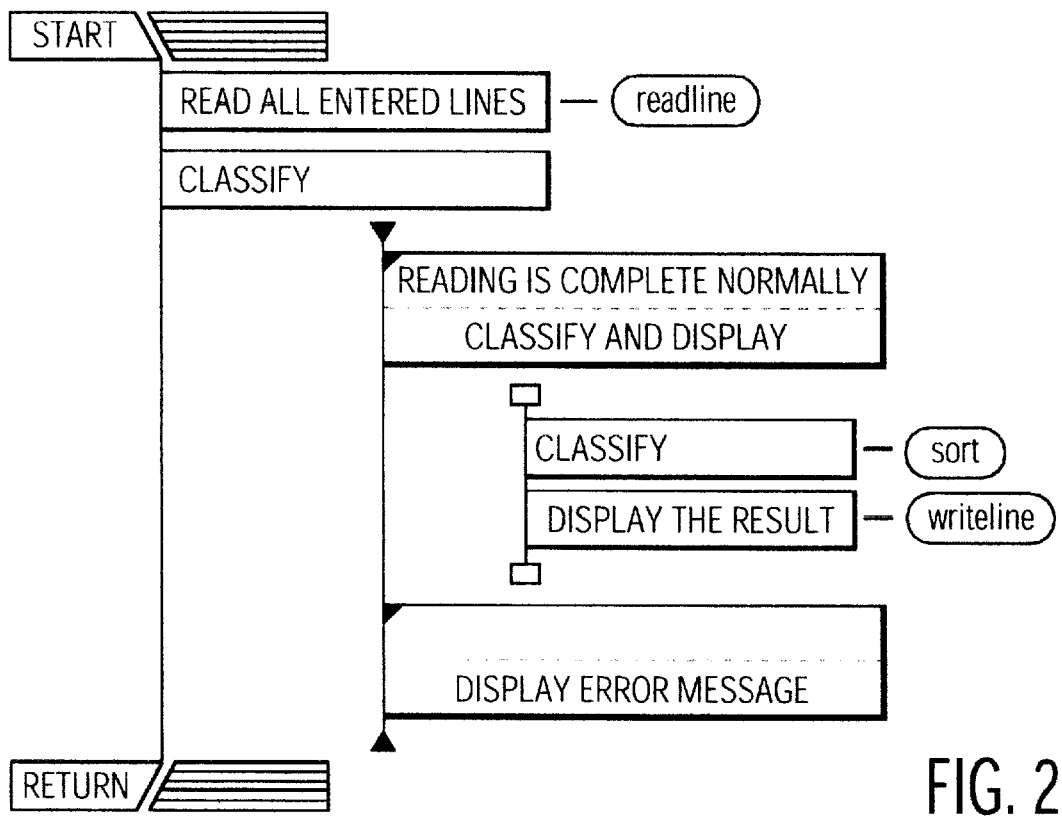
FIG. 1 is a diagram showing an example of the description of a tree structure in accordance with a conventional technique.
FIG. 2 is a diagram showing a resultant output of a tree-structure chart from the tree structure in FIG. 1 by the conventional technique.
Figure 3:
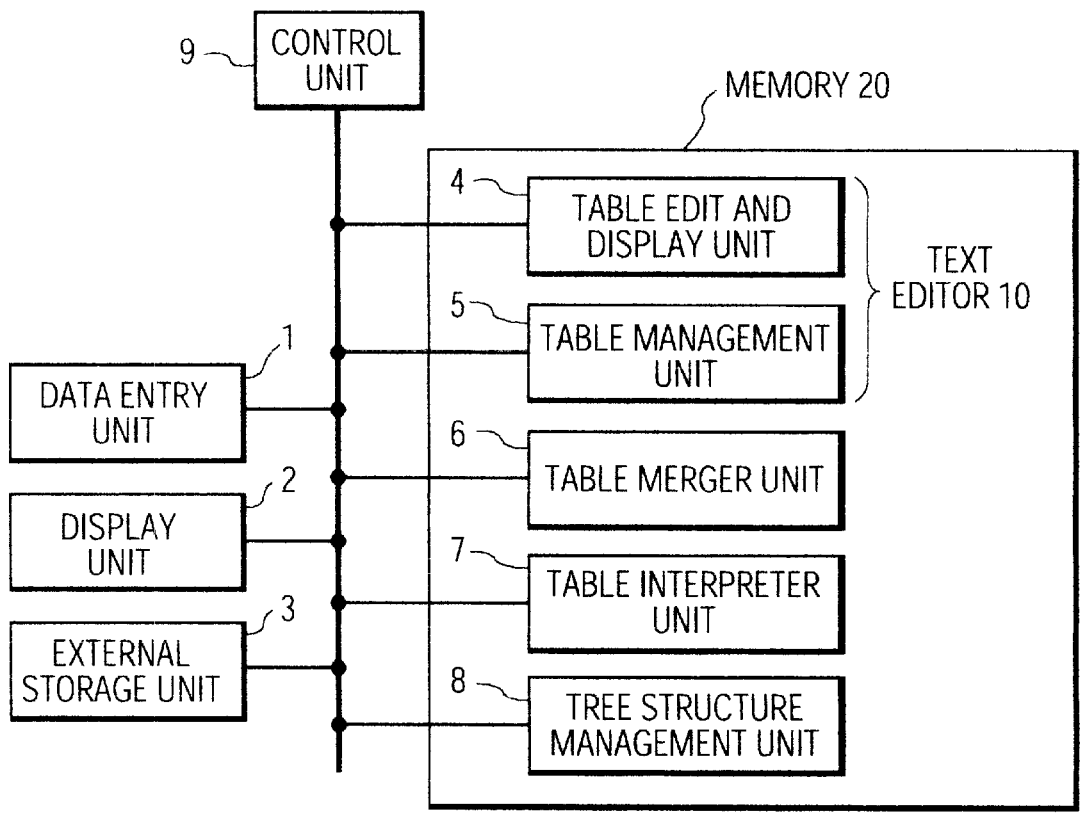
FIG. 3 is a block diagram outlining an example of a tree generating system according to the invention.

FIG. 3 shows a hardware arrangement in keeping with a preferred embodiment of the invention. As shown in the Figure, a tree generating system is made up of the following components: a data entry unit 1, such as a key board; a display unit 2, such as a CRT display; an external storage unit 3, using a magnetic disk, optical disk or the like as its storage medium; and, a memory 20 which may be part of a general purpose computer. Memory 20 may contain: a table edit and display unit 4 for editing and displaying a table; a table management unit 5 for managing the table data, edited by the table edit and display unit 4, and storing it in the external storage unit 3; a table merger unit 6 for merging a plurality of tables into a single table; a table interpreter unit 7 for interpreting the table and thereby allocating an area in memory 20 to each of the nodes or node kinds, setting data on attributes given to each of the nodes or node kinds in the area, and generating pointer data indicating the connections of such areas; and, a tree structure management unit 8 for storing and managing the tree structure data generated by the table interpreter unit 7. A control unit 9 for performing general control over all of these units may be externally located. Specifically, a text editor 10 may be used to implement the table edit and display unit 4 and the table management unit 5. The five units (4 to 8) in memory 20 may be embodied in dedicated hardware devices; however, in the example shown in FIG. 3, they are in the form of software modules loaded in the memory 20, which may be part of a general purpose computer. The implementation of this system in either hardware or software will be within the purview of those of skill in the art using the information set forth in this specification and the following description.

Entry in the Table

Figure 4:
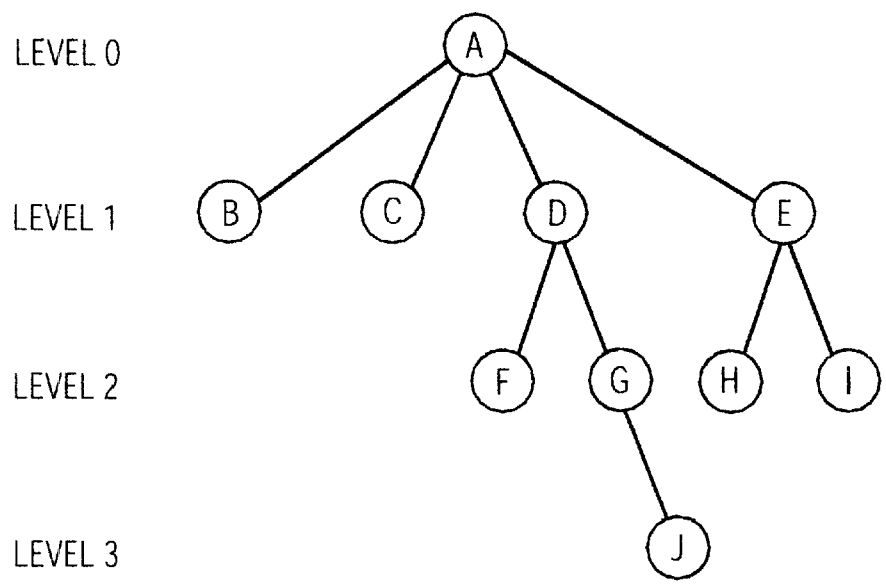
FIG. 4 is a diagram schematically showing an example of a tree.
Figures 5, 6:
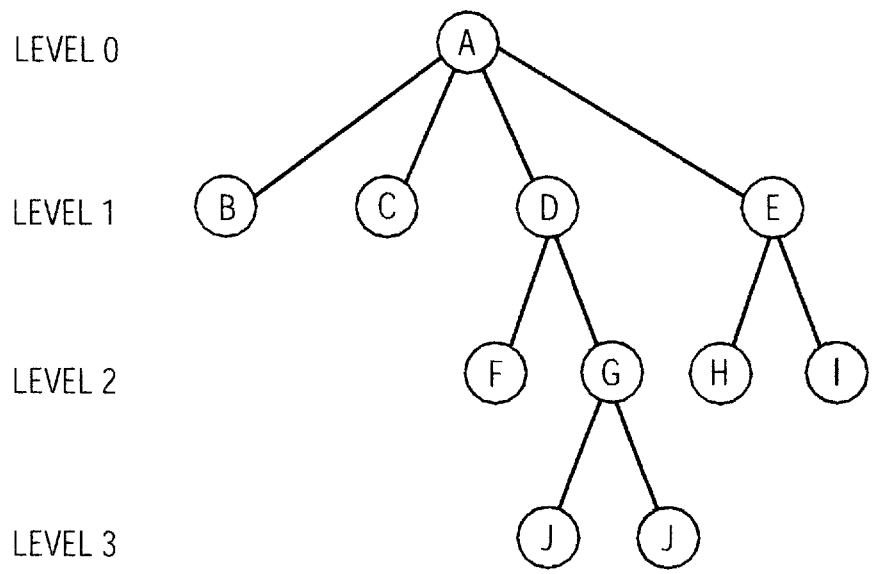
FIG. 5 is a diagram showing a table for describing the tree shown in FIG. 4.
FIG. 6 is a diagram schematically showing another example of a tree.

For the purpose of explaining the manner of making entries to a table in accordance with the invention, a tree such as shown in FIG. 4, containing ten kinds of nodes from 'A' to 'J' with one node for each kind, will be used as an example. According to the invention, it is sufficient for a user to make an entry into a table such as shown in FIG. 5 through the data entry unit 1 while using the text editor 10. The table includes a column for entering the names of nodes or node kinds and a plurality of columns for entering their attributes. For facilitating the table creation, it is preferable to store a table that is blank except in the row for column names in the external storage unit 3 beforehand and then to fetch it for editing. When the editing is accomplished, the completed table may then be stored in the external storage unit 3.

The skeleton of a tree is represented in the table shown in FIG. 5 in the following way. First, the table is provided with a LEVEL column, adjacent a NAME column identifying the nodes, for entering the levels (depths) of the nodes. For example, numeral '0' is entered in the LEVEL column for node 'A' located on the top of the tree (see FIG. 4), and numeral '1' is entered in the LEVEL column for nodes 'B', 'C', 'D', and 'E' which are children of 'A'. The descendants of nodes 'D' and 'E', nodes 'F' to 'J', have appropriate numerals '2' and '3' entered in the LEVEL column.

Next, the links among ancestors and descendants are taken into account. The fact that a descendant node is linked directly or indirectly to an ancestor node is defined in the table by their positioning among the rows. The row for a descendant node is found between the row for its ancestor node and the row of another node which is equal or higher in level than the ancestor node. It is located immediately below the row for its ancestor node, and every row located below this descendant node containing a node at the same or lower level is a descendant of the ancestor.

If a sequence exists among children of a parent, it is reflected in the sequence of rows in the table. For example, assume that a sequence exists among the nodes in level '1' and that they are accordingly arranged in the order of 'B', 'C', 'D', and 'E' from the left in FIG. 4. (Note that the node sequence may actually correspond to a sequence in the vertical direction of physical positions of entities corresponding to the nodes. Then, their corresponding rows would be arranged in the order of 'B', 'C', 'D', and 'E' vertically.)

According to the foregoing rules, the hierarchy of nodes (or node kinds) contained in a tree, and the sequence of nodes (or node kinds) with the same parent, can be expressed by using up-and-down relationships of the rows and the LEVEL column entries in the table. Therefore, when the table shown in FIG. 5 is interpreted in accordance with the rules, it is recognized that 'A' is located on the top of the tree, because 'A' is described in the NAME column at the uppermost row of the table. In addition, with reference to the NAME column at rows with '1' entered in the LEVEL column, it is recognized that 'A' has children 'B', 'C', 'D', and 'E'. The sequence of rows for the children indicates that it is possible that they are arranged in the order of 'B', 'C', 'D', and 'E'.

Further, nodes 'F' and 'G' with levels of '2' and in rows found between the rows for 'D' and 'E' of level '1' are indicated as children of 'D'. Node 'J' with a level of '3' and in a row following the row for 'G' is a child of 'G'. At the bottom of the table, the rows for nodes 'H' and 'I' of level '2' follow the row for 'E' of level 'I'. It is therefore recognized that 'H' and 'I' are children of 'H'. The table interpreter unit 7 performs such interpretations to generate pointer data.

As shown in FIG. 5, the columns for entering attributes in the table include columns for node numbers, each consisting of sub-columns headed MAXIMUM and MINIMUM for entering a minimum value and a maximum value for the number of nodes. The number of nodes of a particular node kind may be indicated by using the row for that node kind. In the present embodiment, however, the number of child nodes are described in the row for their parent. (This rule presupposes that the number of the root node is '1'.) The row for 'A', for example, in the table shown in FIG. 5, described under this rule indicates that the tree represented by the table has one node for each of the node kinds 'B', 'C', 'D', and 'E' as children of node 'A', because the entered minimum and maximum values are '1'. In short, the table shown in FIG. 5 represents a single tree.

A minimum value of '1' and a maximum value of '2' in the row for 'G' would mean that the table corresponds to a set of trees whose members are a tree containing one node of the kind 'J' and a tree containing two such nodes (see FIG. 6). Note, however, that according to the invention, a data structure obtained by converting such a table has only one memory area for the node kind 'J', and minimum and maximum values of the child nodes ('J') are set in the area allocated to the kind 'G' as an attribute of parent 'C'.

If it is required to indicate that a terminal node such as 'J' has any successor and its number is indefinite, appropriately predetermined numbers are entered as minimum and maximum values at the row for the terminal node. In an example of the layout model referred to later, successors of a terminal node correspond to character strings (see FIG. 11).

In the event that a user wants to define a complicated tree, the present embodiment uses the table merger unit 6 in the following manner. As noted above, tables may be stored in the external storage unit 3. Merger unit 6 is capable of determining whether a table fetched from the external storage unit 3 should be combined with another table or not, such as by recognizing blank spaces as will be explained. If the fetched table should be so combined, the unit 6 looks for a table to combine it with, and merges the two tables into one. Using this unit, it is possible to automatically create the description of a different table from those in storage and those entered by a user. Therefore, if a user wants to define a complicated tree and if the external storage unit 3 stores a table defining part of the tree, the stored table may be utilized as a module. For example, assume that the sub-tree with 'D' as its root in the tree shown in FIG. 4 is defined by the table (sub-table) shown in FIG. 7 and stored in the external storage unit 3. Then, in order to define the entire tree shown in FIG. 4, it is sufficient for a user to create the table (main table) shown in FIG. 8, which, being shorter, is easier to describe than that shown in FIG. 5. In the table shown in FIG. 8, the row for 'D' is blank except in its LEVEL column and NAME column, which indicates that 'D' is the root of a sub-tree defined by a different table. In such a case, when the table shown in FIG. 8 is fetched from the external storage unit 3, the table merger unit 6 recognizes the blank indication and accesses the external storage unit 3 to find the table shown in FIG. 7, whereupon it merges the two tables to create the table shown in FIG. 5. The operation of the table merger unit 6 is explained in more detail below.

Layout Model

The method for describing a layout model for a document image will be explained below as a specific example of the representation of a tree structure using a table in accordance with the invention. But first, considering the individual objects in a document: as constituting character strings, it will be appreciated that direct successor objects in a document field always have a sequence in accordance with the manner that people read a text. The sequence is determined by the spatial relationships of the successors on a page, from top to bottom in the case of vertical arrangements or from left to right in the case of horizontal arrangements. For example, the body on a page of the U.S.P.T.O. Official Gazette includes two columns as its successor objects, and they are arranged horizontally. If it can be distinguished whether two successive objects defined in a table belong to the same level or are in different levels, that is, in a predecessor-successor relationship, then objects on a page forming a tree structure can be represented in the form of a one-dimensional sequence of the descriptions for the objects. Such a distinguishing representation is achieved by giving, for example, a numeral in the table indicating the level of the hierarchy to each object. With such an improvement of the description method, a layout model can be expressed in the form of a table in which objects are described in the respective rows.

In a system for layout analysis, the typical information to be specified for a model in accordance with the aforementioned approach is disclosed in Amano et al., "Document Image Recognition System DRS for Entry of Multimedia Document," Information Processing Society of Japan, Special Interest Group of Multimedia Communication and Distributed Processing 48-6, January 1991, as follows. (Hereinbelow, character strings are also regarded as objects.)

1) The limitation on the number of direct successors (minimum and maximum values).

2) If a plurality of successors exist, the direction of their arrangement (vertical or horizontal).

3) Is the existence of the objects in the model mandatory or not?

4) Is there any field separator (a white pixel region, or a horizontal or vertical segment large enough to be a boundary between objects) on the left, right, top or bottom of the object?

5) The sort of characters constituting character strings (numerals, alphabetical letters, Kanji).

6) Is character recognition performed later?

7) Is post-processing done after character recognition?

The attributes for a set of successor objects, such items as 1) and 2), are described in the row for their direct predecessor object as its attribute. Items 3) and following for an object are described in the row for itself.

Figures 9, 10:
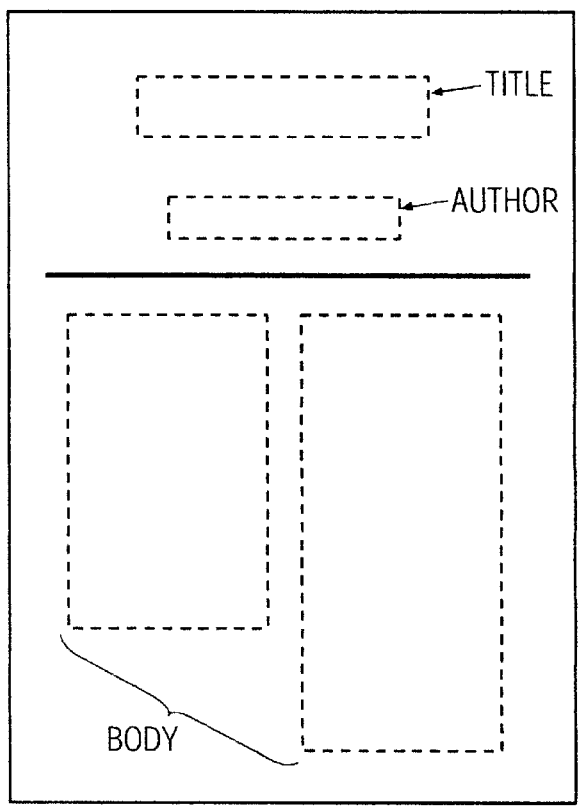
FIG. 9 is a diagram showing a table for describing a layout model.
FIG. 10 is a diagram showing the layout of a document in the form of a front page of a paper.

While an explanation has been made for items 1) to 4), items 5) and following can be described easily by adding columns for entering such attributes. A table for describing a model is shown in FIG. 9. Respective columns have the following definitions:

1) Nest

A number indicating a hierarchical level. An object in the top level of the tree is indicated by '0'. The larger the number, the deeper in the tree (farther from the root) the object occurs.

2) Object Name

A character string expressing the name of an object. If the object is not referred to by another object, it may be blank.

3) Mandatory

This entry indicates whether a particular object necessarily exists on a page or not. 'Y' indicates it necessarily exists, and 'N' indicates it does not.

4) Construction

This is for indicating how an object is constructed. It consists of four sub-columns. If all four sub-columns are blank, it means that the object is defined by another table.

4-1) Arrangement

This entry indicates the direction of arrangement of direct successors, with V for vertical arrangement and H for horizontal arrangement. Expansion to describe the information on pitches and so on is possible.

4-2, 3) Minimum and Maximum

It is possible that a successor may recur. These two sub-columns specify the minimum and maximum values of the occurrence. If an object never recurs, '1' is specified for both.

4-4) Successor's Name

This entry specifies the name of a direct successor included in a particular object. If the successor is a character string, a reserved word Ch_String is entered.

If it is blank, it means that a child object is defined by the immediately subsequent row.

5) F.S.

This entry indicates the position where a field separator exists around a particular object. For example, LW (Left White), LB (Left Black), RW (Right White), RB (Right Black), AW (Above White), AB (Above White), AB (Above Black), BW (Below White), BB (Below Black), blank (no field separator), or the like is described.

FIG. 10 illustrates the front page of a document, such as a paper, to be electronically filed and FIG. 11 shows a table actually describing the front page of the paper shown in FIG. 10. The table in FIG. 11 defines the "Paper" object as consisting of one "Title", once "Author", and one "Body", which are vertically successive. It will be seen that the "Title" object consists of one to three vertically arranged character strings, and the "Author" object consists of one or two vertically successive character strings. The "Body" object consists of two horizontally successive objects without name (corresponding to columns). The objects without name consist of one to fifty vertically successive character strings. A field separator in the form of a black horizontal segment exists between "Author" and "Body" and is indicated in the F.S. column. As shown in FIG. 12, the construction of the object "Body" may be also be defined in a separate table. In such event, the construction sub-columns are all left blank, to indicate that the object is defined by another table.

Generation of a Data Structure

The following description is directed to explaining how a data structure representing a tree or a set of trees is generated in memory in accordance with a table describing a layout model of the front page of a paper.

a. Merger of Tables

Firstly, as explained above, since some tables require a supplementary description from a different table, the table merger unit 6 executes the following operation:

1) It searches rows of an entered table (main table), sequentially from the top, seeking a row at which:

(i) in the column for successor's names the next row is blank; and (ii) the Nest number of the subsequent row is not large than its own Nest number; or (ii') the table has ended there.

2) When such a row (hereinafter called a blank row) has been found, the unit 6 accesses the external storage unit 3 to fetch a table (sub-table) in which column names are the same as those of the main table and the entry in the object name column on the top row is the same as that of the blank row. It then supplements the insufficient description in the blank row with the description on the top row of the sub-table, and inserts the second and the following rows of the sub-table under the supplemented row. At this time, the sums of the Nest number defined for the blank row in the main table and the Nest numbers for the respective rows of the sub-table, are entered in the column for Nest numbers in the corresponding inserted rows.

3) The foregoing steps are iterated until the end of the main table is reached. The same steps are also executed for newly inserted portions.

In short, the table merger unit 6 outputs the entered table unchanged if no blank row exists, and it outputs a new merged table if any blank rows do exist. The new table may be stored in the external storage unit 3.

b. Data Structure Generation

The table output from the table merger unit 6 is sent to the table interpreter unit 7. The table interpreter unit 7 prepares a global variable "int Line" indicating the row currently being processed and setting its initial value as Line=1 (indicating the first row). After this, the unit 7 recursively calls a program GenTree whose pseudo codes are shown below, thereby growing the tree starting from the root.

```
GenTree (pointer to a node Parent Node)
{
/* expression of a local variable */
int Nest;
pointer to a node CurrentNode;
if (if Line is 1) {
    Generate a node for the root, and set the attributes.
    Current Node = address of the root node
} else {
    Generate a node, and set the attributes.
    Current Node = address of the node
    Connect Current Node as a child node to
    ParentNode by a pointer.
}
```

```
Nest = the row number indicated by Line.
do while (the table is continued and Nest number or row
Line + 1 > Nest ) {
    Increment Line.
    call GenTree (Current Node);
}
}
```

When the program is applied to the table shown in FIG. 11, the tree grows in the following way:

1) First, GenTree (NULL) is called with Line=1. Since Line is 1, a root node ('Paper') of the tree is generated in memory (FIG. 13). Note here that a memory area assigned to a node included in a tree or a set of trees is also called a node. Attribute data for 'Paper' is set in the memory area ('Paper' node) assigned to 'Paper'. Since the primary significance of an object name lies in distinguishing the nodes, it will be understood that when a user describes a tree structure, the object name need not be set in the memory area for that object in some applications.

In response to the first call, 0 is set as the variable Nest. Since the Nest number of the next row is 1, the condition for iteration is met. Accordingly, GenTree is recursively called after Line is incremented to 2.

Figure 18:
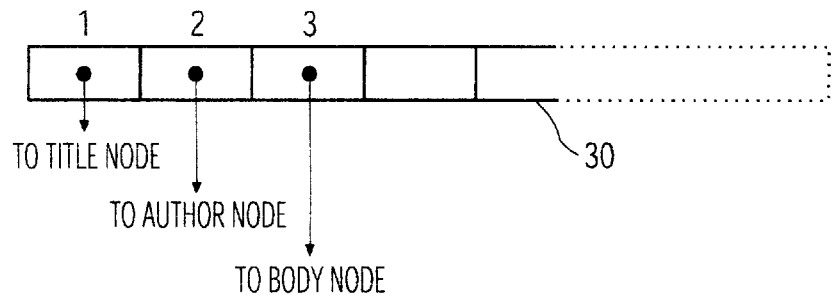
FIG. 18 is a diagram showing an example of the management of pointer data.
Figure 19:
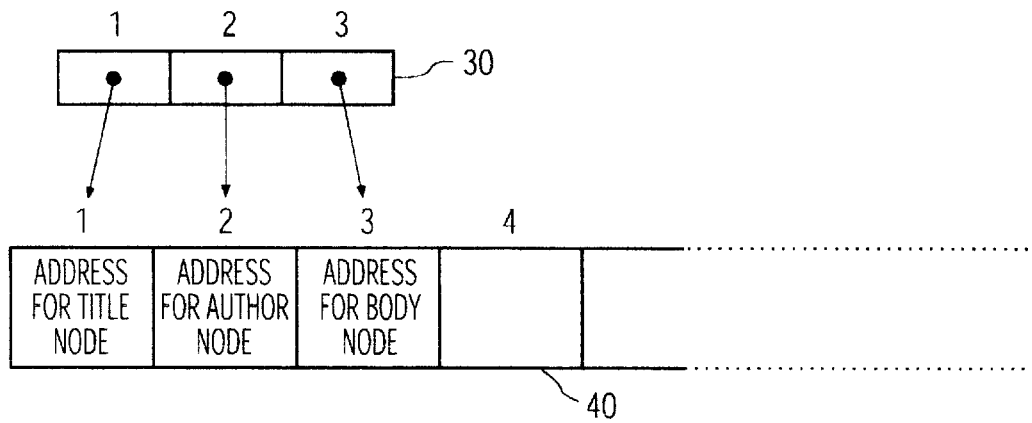
FIG. 19 is a diagram showing another example of the management of pointer data.

2) GenTree is called for the second time under the condition that Line equals 2 and begins processing on the second row of the table. A memory area is assigned to a child ('Title'), and connected to the area of the parent ('Paper') by a pointer (FIG. 14). Specifically, as shown in FIG. 18, an array 30 for storing pointer data to a child node is generated inside or outside the 'Paper' node in memory, and address data to the 'Title' node is set in the array 30. The address data to be set in the array 30 may be a memory address, or it may be an index for another array 40 as shown in FIG. 19. In the latter case, memory addresses are stored in the array 40. This latter scheme is convenient in that a tree structure generated in memory can be stored in the external storage unit 3 in the form of a file, and the address data to be rewritten at the time of loading gathered in the array 40. Thus, pointer data can be managed in various manners as explained here.

In response to the second call, 1 is set as the variable Nest in row 2 of the table in FIG. 11. Since the next number of the next row is also 1, the condition for iteration is not met, and the control therefore returns to the caller immediately.

3) GenTree is called for the third row in the loop of GenTree called at first, and a node corresponding to 'Author' is created in memory in the same manner as in 2). In order to indicate 'Author' as a child of 'Paper', the 'Paper' node and the 'Author' node in memory are connected by a pointer (FIG. 15).

4) In response to the fourth call, the fourth row is processed in the same way, and a node corresponding to 'Body' is created in memory. In order to indicate 'Body' as a child of 'Paper', the 'Paper' node and the 'Body' node in memory are connected by a pointer (FIG. 16). In this case, the condition for iteration is met, and GenTree is therefore called again.

5) In the processing by GenTree called for the fifth time, a parent node given by the argument becomes the node corresponding to 'Body'. The node newly created in memory (without name) is connected to the 'Body' node by a pointer to indicate that the object without name is a child of 'Body' (FIG. 17).

Figure 20:
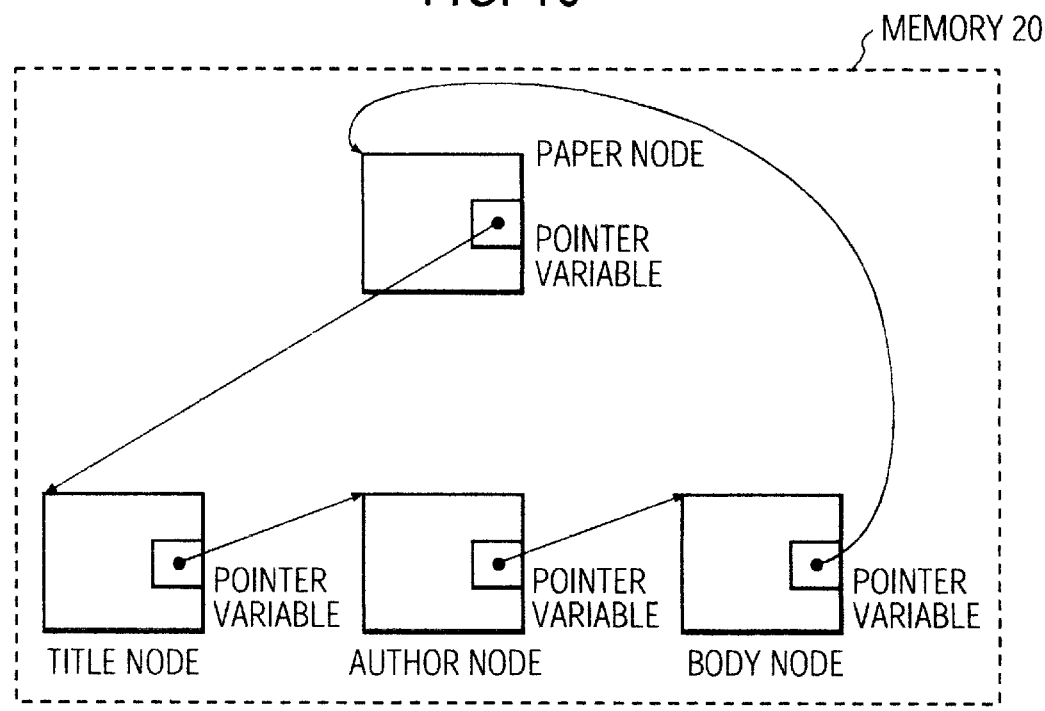
FIG. 20 is a diagram showing still another example of the management of pointer data.

Two methods for managing information in the sequence of children having the same parent are as follows. One method, illustrated in FIGS. 18 and 19, is that indices in an array storing pointer data from the parent node to child nodes are arranged in order of their sequence. Another method, illustrated in FIG. 20, is that a parent node (Paper) has pointer data to the head (Title) of the child nodes. The following child nodes have pointer data to subsequent child nodes, respectively, until the tail child node (Body), which then has pointer data back to the parent node. Since both of these methods are known to those skilled in the art, a detailed explanation as to how they may be implemented is omitted.

Tree-structure data, generated as explained above, is then stored in the external storage unit 3 in the form of a file. By so doing, the tree structure can be restored immediately to memory 20 by loading it again from the file, under the control of unit 9. However, the renewal of pointer data based on memory addresses of the areas newly assigned to respective nodes is necessary.

It will thus be seen that, according to the present invention, all that a user has to do to generate a data structure for a tree or a set of trees in memory is to create a table which includes rows describing attributes of node kinds and arranged in a sequence. A user can also divide a tree into some parts and describe a model using multiple tables. The model description method according to the invention has the following advantages:

1) Description of the information on attributes to be set in respective nodes in memory is easy.

In some applications, it is required to describe not only the skeleton of a tree but also the information on various attributes that nodes in memory have. For example, in a layout model, respective nodes have various attributes, such as, the presence or absence of a field separator, the necessity of the character recognition and the post-processing, and so on. In the present invention, columns for attributes are provided in a table so that the information on attributes given to a node can be easily described by filling in a row for the node. In contrast, the method disclosed by the previously-noted JA PUPA 2-589818 must use a complicated grammar to support such a description method.

2) Description of a tree using a table makes it easy to understand the resultant description.

First, the comparison of attribute values entered in a table is easy. In addition, the skeleton of a tree is fairly understandable because the hierarchy of nodes constituting the tree and the sequence of child nodes linked to a particular node are expressed by the sequence of node names in the name column and their levels (depths in the tree) indicated in the nest column.

In describing a layout model, if the information on the iteration that plural objects of the same kind form a predecessor or parent object is described by a grammar, the recursive description is necessary, which makes the resultant description difficult for users to understand without learning knowledge. In contrast, according to the above-described method of the invention, the iteration can be described easily by expressing relations among successors as attributes of their predecessor.

3) Modularization is expedited by representing trees in the form of tables and accumulating them.

Let a layout model be chosen as an example for explanation. It is rare that a model of a document to be newly entered in memory is completely different from existing models. Usually, it is similar to an existing model at least in part. A user naturally would like to create a new model by modifying or combining usable parts of existing models. To do so, the present invention permits a user to look for and choose tables representing similar layout models stored in the external storage unit 3. The search operation may be performed by displaying tables on the display unit 2 or printing out tables by a printer (not shown). In either event, since skeletons of layout models and attributes for respective objects are fairly understandable from the tables, for the reasons stated in 1), the tables are easily compared. If desired, a search function using node names and attribute names as keys may be added. Such a function may be implemented easily by those skilled in the art. When a similar table is found, desired tree-structure data are obtained by modifying the table in accordance with the layout of a document which the user wants to enter, and then converting it into the tree-structure data by using the tree-structure interpreter and generator unit 7. Alternatively, a new table can also be created by merging usable parts of two or more tables.

4) A tree can be described by using a text editor. Since names and attributes of respective nodes may be described in a table as a one-dimensional succession or rows, an editor dedicated to the handling of tree structures is not required. In addition, if respective column items of tables are defined appropriately, the amount of the information to be entered by a user through a key board to describe a tree structure is minimized. Further, the accumulated data can be modified easily, as set forth in 2). In contrast, with a description method requiring a special editor, such operation is relatively difficult. It is also difficult to implement the function of finding a similar table.

5) A set of trees can be expressed.

As described above, conventional methods can express only one specific tree structure. In layout analysis based on a layout model, description of a set of trees is necessary to cope with variations in the object number. Conventional techniques, which merely support the description of individual trees, are unsatisfactory in this respect. In contrast, the method according to the present invention supports attributes indicating whether the existence of a node of a kind is mandatory or not, attributes indicating information on the number of child nodes, and so on, thereby making it possible to describe not only a single tree but also a set of trees belonging to a particular class (representing the layout structure of, for example, the front page of a paper).

Thus the method according to the present invention has significantly powerful expression capability as compared to conventional techniques.

Variations

The following variations are possible in addition to those already suggested in connection with the explanation of the foregoing embodiment.

First, any symbols other than numerals may be entered in the level or nest column of the table, because it is sufficient to distinguish only level differences of nodes or node kinds in a tree.

When existing tables are used, it is possible to skip the table merger process and generate a single data structure directly from plural data structures corresponding to respective tables. In such case, the tree structure generator unit 7 generates a main tree in memory from a main table and adds one or more sub-trees to it.

Further, the invention can be applied extendedly to fields other than layout understanding. In applications based on the knowledge given beforehand, data on such knowledge in general has the form of tree structures. The invention is widely applicable to the work for the entry of such knowledge. As to the description of a layout model, the column for describing the number of nodes is provided in the table to meet the requirement of expressing a set of tree structures, as stated above. However, for applications merely requiring the description of individual trees, such a column need not be provided.

Advantages of the Invention

Accordingly, it will be seen that with the invention the following advantages are obtained:

(a) a user can describe a tree easily, and the system can generate a data structure corresponding to the tree in memory in accordance with the resultant description;

(b) a user can easily understand a tree structure to be generated from the resultant description, and the system can generate a data structure corresponding to the tree in accordance with the resultant description;

(c) a user can describe a tree by using a text editor, and the system can generate a data structure corresponding to the tree in accordance with the resultant description; and (d) a user can describe a set of trees, and the system can generate a single data structure corresponding to the set of trees in accordance with the resultant description.

What is claimed is:

1. A computerized system for describing and generating in memory a user defined arbitrary data structure corresponding to a tree having nodes, comprising:

means for creating a table for receiving data describing each node of a user defined tree structure, said data including user defined attribute data for each said node, said attribute data including node relationships, said table comprising a set of rows and a set of columns with each row corresponding to a single node contained in said user defined tree structure and each column corresponding to an attribute of said nodes;

means for entering user defined attribute data into said table;

means for interpreting said table to allocate an area in a memory for each of said nodes and setting said attribute data of said nodes respectively in said allocated memory areas; and means for generating pointer data indicating connections of said allocated memory areas according to node relationships indicated in said attribute data.

2. A system as in claim 1 further comprising means for editing said table in response to the entry of said attribute data of each of said nodes by said entering means.

3. A system as in claim 2 further comprising storage means, external of said memory, for storing said table, and means for controlling the storing of data in said table in said storage means.

4. A system as in claim 3 wherein said means for controlling the storing of data in said table in said storage means comprises means for managing data produced by said editing means in response to the entry of attribute data by said entering means.

5. A system as in claim 3 wherein said means for controlling the storing of data in said table in said storage means comprises means for managing data produced by said table interpreting means.

6. A system as in claim 3 wherein said table comprises a main table for containing information relating to some of the nodes in a tree, and a sub-table for containing information relating to some of said nodes in a sub-tree, and further comprising means for merging said main table and said sub-table into a single combined table.

7. A system as in claim 2 wherein said means for editing said table comprises a text editor.

8. A system as in claim 1 further comprising means for entering information on the level of said nodes of said tree in said table.

9. A system as in claim 8 wherein said table interpreting means comprises means for determining the hierarchy of said nodes and the sequence of child nodes beneath a parent node, on the basis of the order of said nodes in said table.

10. A system as in claim 1 further comprising means for displaying said attribute data of each of said nodes in said table.

11. A system as in claim 1 wherein said data describing each node comprises information on node kinds.

12. A system as in claim 11 wherein said data structure contains sets of trees and said node kind information comprises information on whether it is mandatory that a respective node kind exists in every tree that is a member of said set of trees.

13. A system as in claim 1 wherein said attribute data on said nodes comprises information on the maximum and minimum number of said nodes.

14. A computerized method for describing and generating in memory a user defined arbitrary data structure corresponding to a tree having nodes, comprising the steps of:

providing a table for receiving data describing each node of a user defined tree structure, said data including user defined attribute data for each said node, said attribute data including node relationships, said table comprising a set of rows and a set of columns with each row corresponding to a single node contained in said user defined tree structure and each column corresponding to an attribute of said nodes;

entering user defined attribute data into said table;

interpreting said table to allocate an area in a memory for each of said nodes and respectively setting said attribute data of said nodes in said allocated memory areas; and generating pointer data indicating connections of said allocated memory areas according to node relationships indicated in said attribute data.

15. A method as in claim 14 wherein said table is provided in a storage unit external to said memory and fetched therefrom to memory for said interpreting step.

16. A method as in claim 14 further comprising the steps of:

entering data on the attributes of each of said nodes in said table;

editing said table on the basis of the attribute data entered; and interpreting said edited table to allocate an area in said memory for each of said nodes.

17. A method as in claim 14 further comprising the step of displaying said table.

18. A method as in claim 14 wherein the step of providing a table comprises the steps of:

storing information relating to some of the nodes in a main table; storing information relating to some of said nodes in a sub-table; and merging said main table information and said sub-table information into a single combined table.

19. A method as in claim 14 wherein said table interpreting step comprises determining the hierarchy of said nodes and the sequence of child nodes beneath a parent node, on the basis of the order of said nodes in said table.

* * * * *